United States Patent
Bachmaier et al.

(10) Patent No.: US 10,032,581 B2
(45) Date of Patent: Jul. 24, 2018

(54) COUPLING ELEMENT FOR AN ELECTRIC SWITCHING DEVICE

(71) Applicant: SIEMENS AKTIENGESELLSCHAFT, München (DE)

(72) Inventors: Georg Bachmaier, München (DE); Andreas Gödecke, München (DE); Thomas Vontz, München (DE); Wolfgang Zöls, München-Lochhausen (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 15/542,277

(22) PCT Filed: Dec. 29, 2015

(86) PCT No.: PCT/EP2015/081332
§ 371 (c)(1),
(2) Date: Jul. 7, 2017

(87) PCT Pub. No.: WO2016/110430
PCT Pub. Date: Jul. 14, 2016

(65) Prior Publication Data
US 2017/0365426 A1    Dec. 21, 2017

(30) Foreign Application Priority Data
Jan. 8, 2015    (DE) .................. 10 2015 200 135

(51) Int. Cl.
*H01H 33/666* (2006.01)
*H01H 33/664* (2006.01)
*H01H 3/36* (2006.01)

(52) U.S. Cl.
CPC ............ *H01H 33/666* (2013.01); *H01H 3/36* (2013.01); *H01H 33/664* (2013.01); *H01H 2205/002* (2013.01)

(58) Field of Classification Search
CPC .............. H01H 33/664; H01H 33/666; H01H 2033/66253; H01H 2033/6648; H01H 3/36; H01H 3/32; H01H 2205/002
(Continued)

(56) References Cited

U.S. PATENT DOCUMENTS 3,823,281 A * 7/1974 Wilson ................ H01H 3/30
                                                     200/50.21
4,152,562 A * 5/1979 Kohler ................ H01H 33/666
                                                     200/400
(Continued)

FOREIGN PATENT DOCUMENTS

CN        2350863 Y     11/1999
CN       201788887 U      4/2011
(Continued)

OTHER PUBLICATIONS

German Search Report for related German Application No. 10 2015 200 135.0 dated Seotember 30, 2015, with English Translation.
(Continued)

*Primary Examiner* — Renee S Luebke
*Assistant Examiner* — William Bolton
(74) *Attorney, Agent, or Firm* — Lempia Summerfield Katz LLC

(57) ABSTRACT

A coupling element is provided for an electric switching device wherein the coupling element includes a first switching contact for opening and closing an electric contact by a second switch contact. The coupling element has an oblong winding body having two ends that are opposite in the longitudinal direction of the longitudinal axis thereof, wherein the first switch contact is arranged on one end. The
(Continued)

coupling element furthermore includes a rotation body through which the winding body extends and that is provided for coupling to a drive to carry out a rotation movement by the drive, wherein the rotation body includes two sides of which one faces one end (of the winding body and the other faces the other end of the winding body.

20 Claims, 2 Drawing Sheets

(58) Field of Classification Search
USPC .................................................. 218/140, 141
See application file for complete search history.

(56) References Cited

U.S. PATENT DOCUMENTS 5,206,616 A * 4/1993 Stegmuller .......... H01H 33/666
335/126

6,927,355 B2 * 8/2005 Thuresson ............. H01H 33/36
218/84
2015/0303010 A1 * 10/2015 Yu ........................ H01H 33/666
218/140

FOREIGN PATENT DOCUMENTS

| CN | 202159623 U | 3/2012 |
| DE | 10238950 A1 | 3/2004 |
| DE | 102006012431 A1 | 9/2007 |
| EP | 0580285 A2 | 1/1994 |
| EP | 2312606 A1 | 4/2011 |

OTHER PUBLICATIONS

PCT International Search Report and Written Opinion of the International Searching Authority dated Apr. 11, 2016 for corresponding PCT/EP2015/081332, with English Translation.

* cited by examiner

COUPLING ELEMENT FOR AN ELECTRIC SWITCHING DEVICE

CROSS REFERENCE TO RELATED APPLICATIONS

The present patent document is a § 371 nationalization of PCT Application Serial Number PCT/EP2015/081332, filed Dec. 29, 2015, designating the United States, which is hereby incorporated by reference. This patent document also claims the benefit of DE 102015200135.0, filed on Jan. 8, 2015, which is also hereby incorporated by reference.

FIELD

Embodiments relate to a coupling element for an electric switching device.

BACKGROUND

Electric switching devices are used in the low-voltage, medium-voltage, and high-voltage range for the opening and closing of electrical switching contacts. Vacuum switching tubes, in which the electrical switching contacts are arranged in a vacuum, are used, thereby permitting a high dielectric withstand. Electric switching devices may be of simple and compact design. However, a simple and compact design is countered by the complex kinematics involved in the movement of switching contacts in electric switching devices.

Different variants where switching contacts may be actuated in electric switchgear are known, for example, in vacuum switching tubes. EP2312606B1, for example, describes the use of a magnetic drive in the same housing as the tube. Where older systems (e.g., the VM1 system produced by ABB) frequently employed a lever transmission system between the drive and the vacuum switching tube, more recent documents, such as, for example, CN201788887U or CN202159623U propose a direct drive (e.g., a direct, and consequently compact, connection between the actuator and the vacuum switching tube).

A similar arrangement is provided in "reclosers", in which the vacuum switching tube is driven by a direct drive via a magnetic drive (e.g., EP0580285A2 or CN2350863Y).

DE10238950B4 describes an arrangement where the vacuum switching tube and the drive are combined, to the extent that the drive is not housed in the vacuum zone of the switching tube. The drive is maintained at the medium-voltage electrical potential, such that electrical insulation between the drive and the switching tube may be omitted.

SUMMARY AND DESCRIPTION

The scope of the present invention is defined solely by the appended claims and is not affected to any degree by the statements within this summary. The present embodiments may obviate one or more of the drawbacks or limitations in the related art.

Embodiments provide a coupling element for an electric switching device that converts a rotary movement of the drive of the switching device into a linear movement of the switching contacts, simply and flexibly.

The coupling element of one or more of the present embodiments is intended for an electric switching device (e.g., a vacuum switching tube). However, the coupling element may also be employed in other electric switching devices in the low-voltage, medium-voltage, or high-voltage range. The coupling element has a first switching contact for the opening and closing of an electrical contact with a second switching contact.

The coupling element, in an embodiment, provides an oblong winding body, having two ends arranged in opposition in the longitudinal direction of the longitudinal axis thereof where the first switching contact is arranged at one end. The coupling element further includes a rotation body, through which the winding body extends. The rotation body is provided for coupling to a drive to execute a rotary movement using the drive. The rotation body includes two sides. One of the two sides faces the one end of the winding body, and the other of the two sides faces the other end of the winding body. The rotation body is rotatably mounted on the winding body. The winding body is guided in a linear manner, such that the winding body is not rotatable about the longitudinal axis, but may be moved in the longitudinal direction thereof relative to the rotation body.

In an embodiment, the winding body, on one or both of the two sides of the rotation body, includes at least one flexible wire in each case (e.g., a plurality of flexible wires). For example, a plurality of wires that are arranged or tautened between the rotation body and the winding body such that, by opposing rotary movements of the rotation body, a winding and unwinding of the wire(s) is caused on the winding body. As a result, the winding body is moved in the longitudinal direction thereof relative to the rotation body, to open and close the electrical contact of the first switching contact with the second switching contact.

The coupling element according to an embodiment, converts the rotary movement produced by a drive into opening or closing movements of the switching contacts. By using a configuration of the winding body on which the wires are wound and unwound, the kinematics of the movement of the first switching contact may be adapted to the required circumstances in a flexible manner.

In an embodiment, the rotation body is a disk-shaped body, both sides of which are circular. The winding body may extend through the center of the disk-shaped body. The coupling element is compact. In an embodiment, the disk-shaped body includes a single disk, but may also include a plurality of disks that are sequentially arranged in the longitudinal direction of the winding body and are mutually spaced, where applicable.

In an embodiment of the coupling element, on one or both sides of the rotation body, the wire(s) that are arranged on a respective side are attached in each case at one end to the rotation body (e.g., to the edge of the rotation body), and at the other end to the winding body. The attachment to the winding body may be arranged at the end of the winding body that faces the respective side of the rotation body. An efficient conversion of the rotary movement of the rotation body into a linear movement of the winding body is achieved. The term "the respective side" may refer to a single side, if the plurality of wires is provided on one side only.

In an embodiment of the coupling element, on one or both sides of the rotation body, the wires arranged on a respective side, in an overhead view, are symmetrically positioned around the winding body on the respective side of the rotation body. A uniform conversion of the rotary movement into the lifting movement is achieved. The term "symmetrical" refers to that, in an overhead view, the angle between adjoining wires on the respective side is of equal magnitude.

In an embodiment, on one or both sides of the rotation body, the wires arranged on a respective side are configured in one or more pairs of wires, where the wires of a respective pair, in an overhead view of the respective side of the rotation body, are offset by an angle of 180° around the longitudinal axis of the winding body. A simple design of the coupling element is thus achieved.

In a further embodiment, on both sides of the rotation body, the wires are arranged such that, upon a rotary movement of the rotation body in the one direction, the wires are wound onto the one side and unwound from the other side and, upon a rotary movement of the rotation body in the other direction, the wires are unwound from the one side and wound onto the other side. The kinematics for both the opening and the closing of the switching contacts may be achieved in a simple manner.

The winding body on the coupling element may be of a different design. The winding body may be of circular cross-section. The winding body may be, for example, a cylindrical bar of uniform circular cross-section, such that a constant speed of movement of the first switching contact is achieved. However, the diameter of the circular cross-section does not need to be uniform in the longitudinal direction of the winding body.

To vary the kinematics of the movement of the first switching contact, the winding body, in an embodiment, on one or both sides of the rotation body, is formed in each case such that the thickness. For example, the diameter of the, where applicable, circular cross-section thereof varies in the longitudinal direction thereof (e.g., at least in sections) and, for example, increases or decreases in a continuous manner.

In an embodiment thus described, the thickness of the winding body, on the side of the rotation body that faces the end of the winding body upon which the first switching contact is arranged, increases in the longitudinal direction of the winding body through to the end. A progressive translational characteristic is achieved. The first switching contact, in the event of a small clearance between the first switching contact and the second switching contact, moves more rapidly, such that the electrical contact is opened and closed more rapidly. Electrical flashovers between the first switching contact and the second switching contact may be prevented. The thickness of the winding body, on the other side of the rotation body, decreases in the longitudinal direction of the winding body through to the other end of the winding body. The shape of the winding body on the one side corresponds to the shape of the winding body on the other side. A uniform winding and unwinding of the wires on both sides of the rotation body is achieved, and any loss of tension in the wires is prevented.

In an embodiment, the thickness of the winding body, on the side of the rotation body that faces the end of the winding body upon which the first switching contact is arranged, decreases in the longitudinal direction of the winding body through to the end. A degressive translational characteristic is achieved where the first switching contact, in the event of a small clearance between the first switching contact and the second switching contact, moves more slowly. In an embodiment the thickness of the winding body, on the other side of the rotation body, increases in the longitudinal direction of the winding body through to the other end of the winding body. The shape of the winding body on the one side corresponds to the shape of the winding body on the other side. A uniform winding and unwinding of the wires on both sides is achieved, and any loss of tension in the wires is thus counteracted.

In an embodiment of the coupling element, the first switching contact is directly connected to the winding body, at the one end of the winding body. The connection may also be configured indirectly, with the interposition of an elastic element, by which kinetic energy is stored upon the closing of electrical contact.

In an embodiment of the coupling element, at least part of the wires on one side or on both sides of the rotation body incorporate elastic elements. The corresponding wires may also be of elastic design. Pre-tensioning of the wires is achieved, such that variations in the winding speeds on opposing sides of the winding body are counteracted.

In addition to the coupling element, embodiments also provide an electric switching device (e.g., a vacuum switching tube), in which an electrical contact of a first switching contact with a second switching contact may be opened and closed. The switching device includes a coupling element for the opening and closing of the electrical contact.

DETAILED DESCRIPTION

Embodiments provide a coupling element. The function of the coupling element includes the opening and closing of the switching contacts in a vacuum switching tube. However, the coupling element may also be employed in other switching devices for the opening and closing of an electrical contact.

Figure 1:
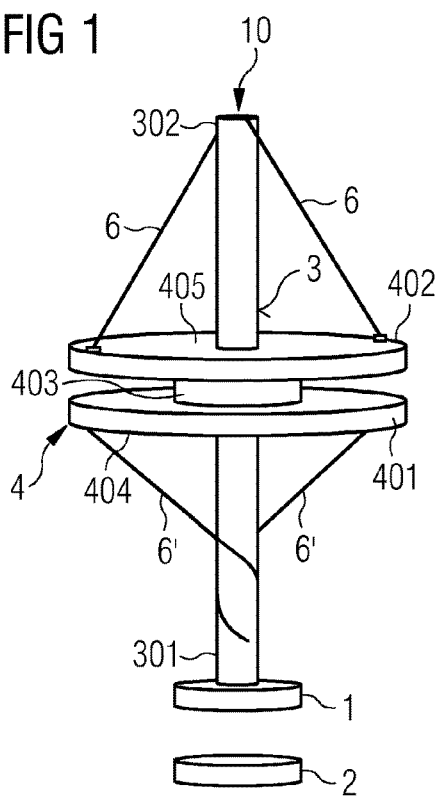
FIG. 1 depicts a schematic of an embodiment of a coupling element.
Figure 2:
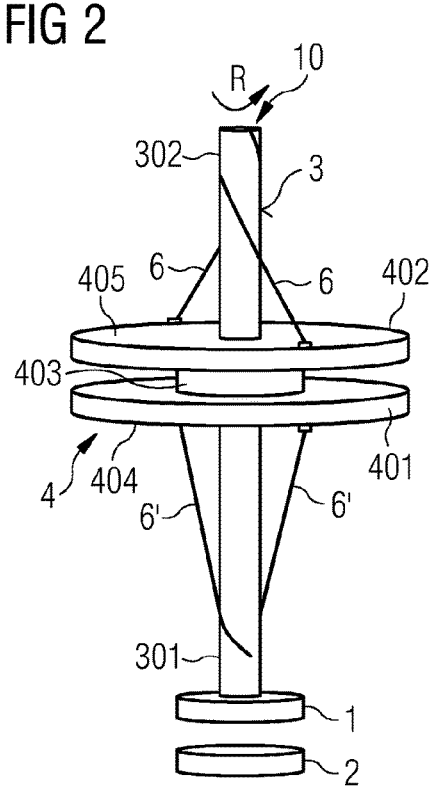
FIG. 2 depicts another schematic of an embodiment of a coupling element.
Figure 3:
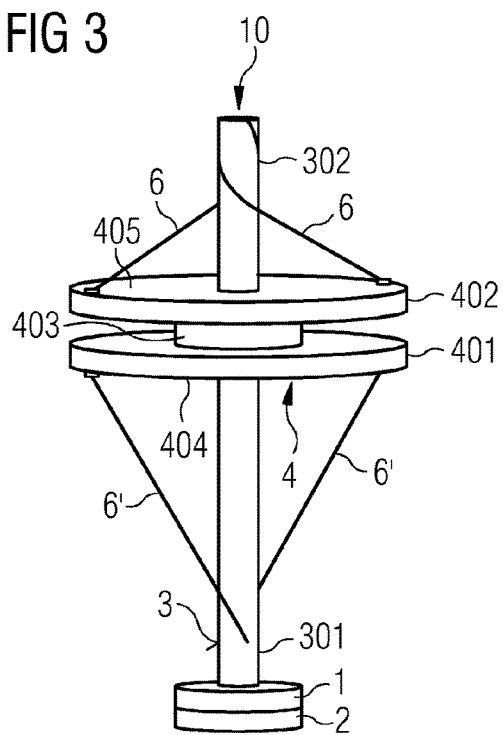
FIG. 3 depicts another schematic of an embodiment of a coupling element.

FIGS. 1 to 3 depicts an embodiment of a coupling element 10. A contact system including the disk-shaped switching contacts 1 and 2 is actuated. The switching contact 1 moves in relation to the switching contact 2. By the contacting of the two switching contacts 1 and 2, an electric circuit is closed, and a current flux is delivered via the electrically-conductive winding body 3 and the contact system of the switching contacts 1 and 2. The current flux may be interrupted once more by the opening of the contact system, by the separation of the two switching contacts 1 and 2.

The switching contact 1 is attached to a lower end 301 of the winding body 3, also referred to as the winding bar. The winding body 3 is configured for linear displacement along a longitudinal axis, and cannot be rotated. A rotation body 4 is rotatably mounted on the winding body, e.g. the rotation body 4 may rotate on the winding body. The rotation body includes two mutually-spaced disks 401 and 402, between which an annular bearing 403 is arranged, by which the bearing arrangement of the rotation body 4 on the winding bar 3 is achieved. The winding body 3 extends through the bearing 403, via corresponding bores in the center of the disks 401 and 402.

In the coupling element in FIG. 1, a rotary movement of the rotation body 4, that is generated by an unrepresented drive (e.g. a spring or an external motor), is converted into a linear movement of the switching contact 1 by the use of flexible wires 6 and 6'. On the upper side 405 of the disk 402, two oppositely-arranged flexible wires 6 are arranged that with a mutual angular offset of 180°, are connected at one end to the edge of the disk 402, and at the other end to the upper end 302 of the winding bar 3. Analogously, on the underside 404 of the disk 401, two flexible wires 6' are arranged, again with a mutual angular offset of 180°, and connected at one end to the edge of the disk 401, and at the other end to the lower end 301 of the winding bar 3.

By the rotary movement of the rotation body 4 generated by the drive, a winding or unwinding of the wires 6 and 6' on the winding bar 3 is initiated that, as a result of the linear tracking of the winding bar, generates the movement thereof in the longitudinal direction, and thus the opening or closing of the switching contacts 1 and 2. FIG. 1 represents the state in which both the switching contacts 1 and 2 are in the open circuit position. In the state, the two wires 6' are wound onto the lower part of the winding body 3, such that the free length of the wires is shortened, and the switching contact 1 is in an upper position, with a maximum clearance from the switching contact 2. At the same time, the flexible wires 6 on the upper side 405 of the rotation body 4 are in the unwound state.

If the switchover from the open circuit state to the contact state of the two switching contacts 1 and 2 is executed, a rotary movement of the rotation body in the direction indicated by the arrow R (see FIG. 2) is generated by the drive resulting in the unwinding of the wires 6' and, conversely, the winding of the wires 6. A downward force is exerted on the winding bar 3, such that the contact 1 moves towards the contact 2, as depicted in FIG. 2. In the representation depicted in FIG. 3, the rotation of the rotation body continues to the point where the contact position is achieved, in which contact is established between the two switching contacts 1 and 2.

The closed contact position depicted in FIG. 3 may be re-opened by a rotation of the rotation body conversely to direction represented by the arrow R. The wires 6' are wound back onto the winding body, where the wires 6 are unwound from the winding body, thereby exerting an upward force. The open circuit position depicted in FIG. 1 is restored. In an embodiment, using an appropriate locking mechanism, the coupling element may be (detachably) locked in both the contact position and the open circuit position.

The arrangement of the wires represented as depicted in FIGS. 1 to 3 may be varied, as required. Specifically, on either side of the rotation body, where applicable, more than two wires may be provided if, e.g. the force to be transmitted exceeds the permissible tensile loading of two wires only. A symmetrical arrangement of the wires both above and below the rotation body, as in the case of the form of embodiment represented in FIGS. 1 to 3, is appropriate, as this permits the appropriate transmission of forces in both the upward and downward direction.

Where applicable, however, wires may also be provided on one side of the rotation body 4 only, thus permitting a force to be exerted in one direction only, for example on the grounds that the force of gravity is sufficient to effect the movement of the winding bar in the other direction. If, for example, that the vertical direction from top to bottom in FIGS. 1 to 3 corresponds to the direction of the force of gravity, where applicable, only the wires 6' might be provided that, from the state represented in FIG. 3, by rotation conversely to the direction R, causes an opening of the contact, whereas the contact is closed by the force of gravity only.

FIGS. 4 to 7 depict variants of the coupling element. Identical or mutually-corresponding components are identified by the same reference symbols as those applied to the form of embodiment in FIGS. 1 to 3. The design and function of the coupling element shown in FIGS. 4 to 7 substantially correspond to those of the coupling element in FIGS. 1 to 3.

Figure 4:
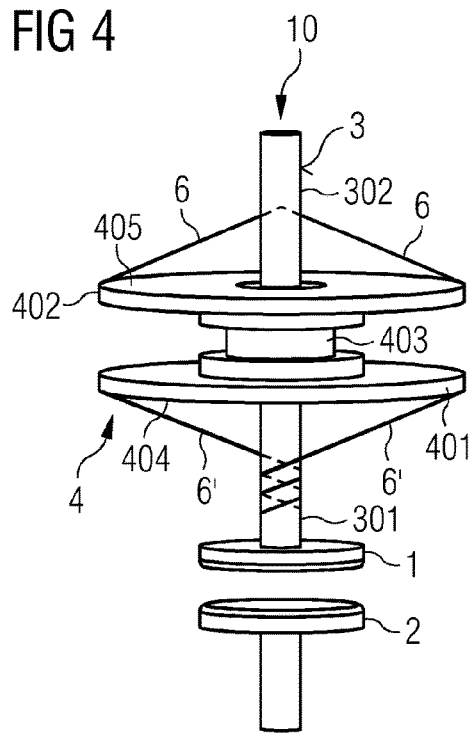
FIG. 4 depicts a coupling element according to an embodiment.

The coupling element according to FIG. 4 corresponds to the coupling element represented in FIGS. 1 to 3, where as a winding body 3, a relatively thin winding bar is employed, in consequence whereof less wire is unwound or wound per rotation of the rotation body 4, thereby causing a slower movement of the winding body, and thus a slower opening or closing of the contacts 1 and 2.

Figure 5:
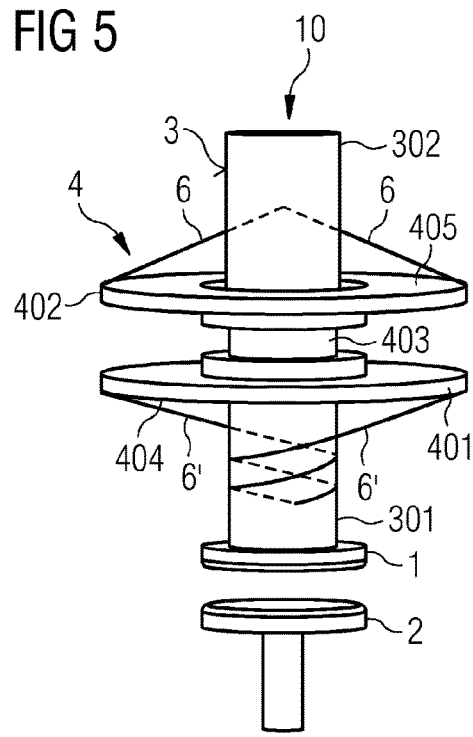
FIG. 5 depicts a coupling element according to an embodiment.

Conversely to FIG. 4, the winding body of the coupling element in FIG. 5 is configured as a cylindrical bar of substantially greater thickness. Consequently, more wire is wound or unwound per rotation of the rotation body 4, in consequence whereof a more rapid relative movement of the contacts 1 and 2 is achieved, and thus a more rapid opening and closing process.

Figure 6:
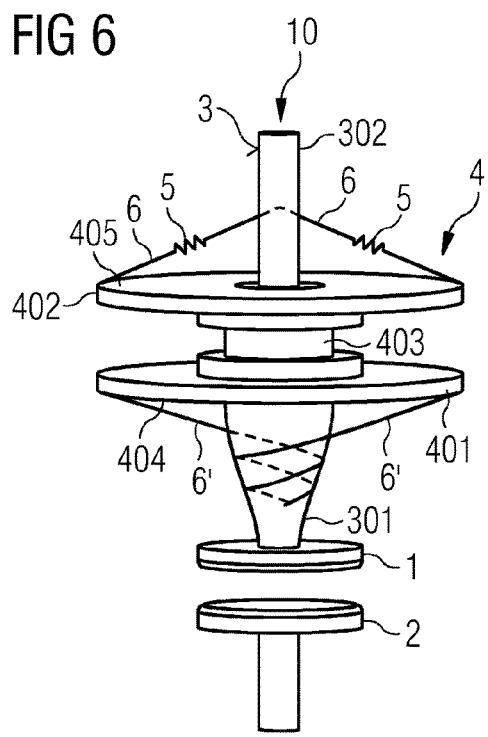
FIG. 6 depicts a coupling element according to an embodiment.

FIG. 6 depicts a form of the winding body 3, in which the lower part of the winding body, on the side 404 of the rotation body 4, is of a bottleneck design, with a diameter that decreases towards the switching contact 1. A degressive translational characteristic is achieved, e.g. the further the linear movement of the winding body 3 proceeds in a downward direction, the slower the movement becomes permitting a cushioned engagement of the switching contact 1 with the switching contact 2.

Figure 7:
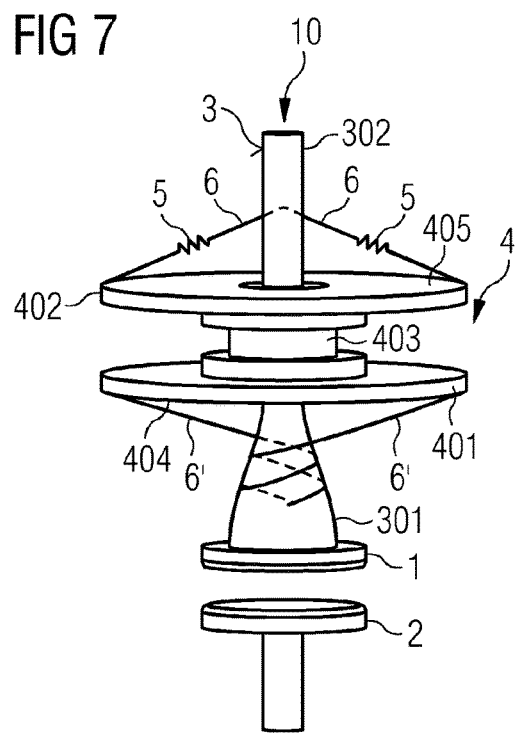
FIG. 7 depicts a coupling element according to an embodiment.

Conversely to FIG. 6, the lower part of the winding body 3 in FIG. 7 is configured as an inversely-oriented bottleneck, e.g. the diameter of the winding body increases from the side 404 of the rotation body 4 towards the switching contact 1. A progressive translational characteristic is achieved where, prior to the closing of the switching contacts 1 and 2, a clear acceleration in the movement of the switching contact 1 is executed, as a result of a more rapid unwinding of the wires 6'. The embodiment is employed if a slow start-up in the movement of switching contact 1 out of the open circuit position is preferred, but the closing speed is simultaneously to be increased as the switching contacts approach the closed position, for example, to prevent electrical flashovers that is suitable for application in the switching contacts in a vacuum switching tube.

In the variants shown in FIGS. 6 and 7, the upper wires 6 incorporate spring elements 5. Where applicable, the spring elements may additionally be provided in the wires 6'. Using the spring elements, the pretensioning of the wires may be accurately configured. Any differences between the winding speeds of the wires 6 and 6' on opposing sides of the winding body may be absorbed by the spring elements, and result in only a slight change to the pretensioning of the wires. Moreover, the spring elements may be configured with a relatively large spring deflection, such that pretensioning may be maintained in a stable manner over a long service time. Where applicable, in place of the spring elements, the wires may also be of elastic design.

In an embodiment depicted in FIGS. 6 and 7, the upper part of the winding body is again of cylindrical design. In an embodiment, the upper part of the winding body is configured identically to the lower part. In the form of embodiment represented in FIGS. 6 and 7, the upper part of the winding body (down to the part that, upon the closing of the contact, penetrates the bearing 403), is configured with an identical bottleneck design to the lower part, where the thickness of the bottleneck in FIG. 6 increases through to the upper end 302 of the winding body, and in FIG. 7 decreases through to the upper end 302 of the winding body.

By this arrangement, any loss of tension in the wires during winding or unwinding is prevented. For example, in the event of the slower winding of the wire on the upper part of the winding body, the corresponding wire on the lower part of the winding body is also unwound more slowly, and thus does not slacken. The wire on the upper part of the winding body is prevented from being wound more rapidly than the corresponding wire on the lower part of the winding body which would result in the obstruction of kinematics.

In a further embodiment, complex forms of the winding body are also possible, to permit more extensive adjustments to the translational dynamic, for example, for adaptation to the specific physics of electrical switching contracts or electric arcing.

Embodiments provide for the conversion of a rotary movement into a linear movement associated with the winding or unwinding of wires on a winding body, the desired lever ratio may be established in a simple manner and, by the form of the winding body, may be controlled over an extensive range with no problem. Specifically, progressive and degressive forms of the winding body may be employed for the appropriate control of speeds in the terminal positions of the switching contacts. In an embodiment, the wires employed are further configured with spring elements or are of elastic design, such that a stable and long-term tensioning of the wires may be achieved, and any variations in travel between the upper part and the lower part of the winding body may be compensated.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present invention has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A coupling element for an electric switching device, the coupling element comprising:
   a first switching contact configured for the opening and closing of an electrical contact with a second switching contact;
   an oblong winding body having two ends arranged in opposition in a longitudinal direction of a longitudinal axis with the first switching contact arranged at one end; and
   a rotation body, through which the winding body extends, the rotation body configured for coupling to a drive to execute a rotary movement by the drive, wherein the rotation body comprises two sides, one side of the two sides facing the one end of the winding body, and another side of the two sides facing another end of the winding body;
   wherein the rotation body is rotatably mounted on the winding body, and the winding body is guided in a linear manner, such that the winding body is not rotatable about the longitudinal axis thereof, but is movable in the longitudinal direction relative to the rotation body;
   wherein on one or both of the two sides of the rotation body, a plurality of wires are arranged between the rotation body and the winding body such that, by opposing rotary movements of the rotation body, a winding and unwinding of the plurality of wires is caused on the winding body and, as a result, the winding body is moved in the longitudinal direction relative to the rotation body, in order to open and close the electrical contact of the first switching contact with the second switching contact.

2. The coupling element of claim 1, wherein the rotation body is a disk-shaped body,
   wherein both of the two sides are circular, and
   wherein the winding body extends through a center of the disk-shaped body.

3. The coupling element of claim 2, wherein the disk-shaped body comprises a plurality of disks that are sequentially arranged in the longitudinal direction of the winding body.

4. The coupling element of claim 3, wherein the winding body is of circular cross-section.

5. The coupling element of as claimed in claim 4, wherein the winding body is a cylindrical bar.

6. The coupling element of claim 1, wherein on one or both of the two sides of the rotation body, the plurality of wires that are arranged on a respective side of the two sides are attached in each case at one end to the rotation body, and at the other end to the winding body.

7. The coupling element of claim 1, wherein on one or both of the two sides of the rotation body, the plurality of wires arranged on a respective side of the two sides, in an overhead view, are symmetrically positioned around the winding body on the respective side of the rotation body.

8. The coupling element of claim 1, wherein, on one or both of the two sides of the rotation body, the plurality of wires arranged on a respective side of the two sides are configured in one or more pairs of wires, and
   wherein wires of a respective pair, in an overhead view of the respective side of the two sides of the rotation body, are offset by an angle of 180° around the longitudinal axis of the winding body.

9. The coupling element of claim 1, wherein, on both sides of the two sides of the rotation body, the plurality of wires are arranged such that, upon a rotary movement of the rotation body in the one direction, the plurality of wires are wound onto the one side and unwound from the other side and, upon a rotary movement of the rotation body in an opposite direction, the plurality of wires are unwound from the one side and wound onto the other side.

10. The coupling element of claim 1, wherein the winding body is of circular cross-section.

11. The coupling element of claim 10, wherein the winding body is a cylindrical bar.

12. The coupling element of claim 1, wherein the winding body, on one or both of the two sides of the rotation body, is formed in each case such that a thickness thereof varies in the longitudinal direction thereof and, increases or decreases in a continuous manner.

13. The coupling element of claim 12, wherein the thickness of the winding body, on the side of the rotation body that faces the end of the winding body upon which the first switching contact is arranged, increases in the longitudinal direction of the winding body through to the end and the thickness of the winding body, on the second side of the rotation body, decreases in the longitudinal direction of the winding body through to the other end of the winding body.

14. The coupling element of claim 1, wherein a thickness of the winding body, on the side of the rotation body that faces the end of the winding body upon which the first switching contact is arranged, decreases in the longitudinal direction of the winding body through to the end and the thickness of the winding body, and on the other side of the rotation body, increases in the longitudinal direction of the winding body through to the other end of the winding body.

15. The coupling element of claim 1, wherein the first switching contact is directly connected to the winding body, at the one end of the winding body, or with an interposition of an elastic element.

16. The coupling element of claim 1, wherein at least part of the plurality of wires on one or both of the two sides of the rotation body incorporate elastic elements, are of elastic design, or incorporate elastic elements and are of elastic design.

17. An electric switching device comprising:
   a first switching contact configured for the opening and closing of an electrical contact with a second switching contact;
   an oblong winding body having two ends arranged in opposition in a longitudinal direction of a longitudinal axis with the first switching contact arranged at one end; and
   a rotation body, through which the winding body extends, configured for coupling to a drive to execute a rotary movement by the drive, wherein the rotation body comprises two sides, one side of the two sides facing the one end of the winding body, and a second side of the two sides facing another end of the winding body,
   wherein the rotation body is rotatably mounted on the winding body, and the winding body is guided in a linear manner, such that the winding body is not rotatable about the longitudinal axis thereof, but is movable in the longitudinal direction relative to the rotation body, and
   wherein on one or both of the two sides of the rotation body, a plurality of wires are arranged between the rotation body and the winding body such that, by opposing rotary movements of the rotation body, a winding and unwinding of the plurality of wires is caused on the winding body and, as a result, the winding body is moved in the longitudinal direction thereof relative to the rotation body, in order to open and close the electrical contact of the first switching contact with the second switching contact.

18. The electric switching device of claim 17, wherein the electric switching device is a vacuum switching tube.

19. The electric switching device of claim 17 claims, wherein the winding body is of circular cross-section.

20. The electric switching device of as claimed in claim 19, wherein the winding body is a cylindrical bar.

* * * * *